United States Patent

Wasyliw et al.

Patent Number: 5,284,894
Date of Patent: Feb. 8, 1994

[54] LOW-FOAMING LATEXES FOR USE IN PRINTING INK FORMULATIONS

[75] Inventors: Basil Wasyliw, Newark; Edward Stone, Morris Plains, both of N.J.; John G. Pucknat, New York, N.Y.

[73] Assignee: BASF Corporation, Parsippany, N.J.

[21] Appl. No.: 79,491

[22] Filed: Jun. 21, 1993

Related U.S. Application Data

[63] Continuation of Ser. No. 968,241, Oct. 29, 1992, abandoned, which is a continuation of Ser. No. 765,404, Sep. 24, 1991, abandoned, which is a continuation of Ser. No. 484,030, Feb. 22, 1990, abandoned.

[51] Int. Cl.⁵ .................. C08K 5/06; C08L 33/02; C08L 33/06; C08L 37/00
[52] U.S. Cl. .................. 524/377; 524/517; 524/522; 524/523
[58] Field of Search ........... 524/377, 505, 517, 522, 524/523

[56] References Cited

U.S. PATENT DOCUMENTS

| | | | |
|---|---|---|---|
| 4,680,827 | 3/1987 | Becker | 524/377 |
| 4,687,789 | 8/1987 | Gonnet | 524/377 |
| 4,847,316 | 7/1989 | Schick | 524/377 |

*Primary Examiner*—Paul R. Michl
*Assistant Examiner*—Peter Szekely
*Attorney, Agent, or Firm*—Michael R. Chipaloski

[57] ABSTRACT

A low-foaming resin-fortified latex comprising a dispersed acrylic polymer, polyelectrolyte resin and a non-ionic emulsifier with an HLB value of 13 or less.

4 Claims, No Drawings

LOW-FOAMING LATEXES FOR USE IN PRINTING INK FORMULATIONS

This is a continuation of copending application(s) Ser. No. 07/968,241 filed on Oct. 29, 1992, now abandoned, which is a continuation of copending application(s) Ser. No. 07/765,404 filed on Sep. 24, 1991 now abandoned, which is a continuation of copending application(s) Ser. No. 07/484,030 filed on Feb. 22, 1990 now abandoned.

BACKGROUND OF THE INVENTION

Latexes have been developed for use in printing inks and coatings for applications on a variety of substrates. These latexes are especially suitable as vehicles for coating onto polyolefin surfaces. These materials, designated as "fortified" latexes, provide a number of desirable properties, including mechanical and thermal stability, good processibility and maintenance of viscosity in formulations under high shear conditions. An especially useful latex is the "fortified latex" disclosed and claimed in copending application CIP of Ser. No. 667,662 filed Oct. 9, 1986 and entitled, "Latex Vehicles for Printing Inks and Coatings". Although these latex formulations have proved useful, the occurrence of foaming in ink and coating formulations made with these latexes has been a problem which limits their usefulness.

U.S. Pat. No. 4,820,762 issued to Sheng-Liang Tsaur, discloses a resin-fortified latex polymer prepared by the addition of the resin ". . . to the reaction mixture during the emulsion polymerization i.e., after the initiation of the emulsion polymerization reaction is substantially completed . . . ". This method employs conventional surfactants (anionic or nonionic or combinations of these) which are recommended for emulsion (oil-in-water) polymerizations and known to the art.

The major problem confronting the widespread use of resin fortified latexes in inks and coatings is the occurrence of foaming and insufficient wetting of substrates. Foaming is especially prevalent in inks and coatings applied on a printing press. To overcome these problems, formulators generally add defoamers and wetting agents.

The present invention overcomes these difficulties by using an ammonia salt of a polyelectrolyte resin as the anionic surfactant in combination with a water-in-oil nonionic surfactant as the emulsifier system in an otherwise conventional emulsion polymerization recipe. The polyelectrolyte eliminates the need for anionic surfactants thus simplifying the process. It also imparts exceptional mechanical stability to the latex and ensures the formation of very small particle size. In fact, the products of this invention may be characterized as microemulsions (particle size less than 120 nanometers). The water-in-oil nonionic surfactant reduces the tendency to foam significantly and improves the wetting of substrates.

SUMMARY OF THE INVENTION

The invention relates to a low foaming resin-fortified latex prepared by utilizing a polyelectrolyte resin and a nonionic emulsifier as cosurfactants in a free radical emulsion polymerization. The polyelectrolyte resin is preferably any low molecular weight resin which is soluble or dispersible in alkaline solutions. The nonionic cosurfactant is important to obtaining a low foaming emulsion and has an HLB value equal to or less than 13, preferably between 1 and 7, and a cloud point below the temperature applied in the preparation of the emulsion. The emulsion polymerization is carried out by conventional means i.e., monomers are added to a premix of polyelectrolyte resin, coemulsifier, water, initiator, and buffer. The addition of monomers and initiators may be regulated as necessary to achieve specific results; however, the monomers are generally added over a period of 2-6 hours. The resulting latex has excellent mechanical and freeze-thaw stability and very low foaming characteristics.

DETAILED DESCRIPTION OF THE INVENTION

The invention relates to low foaming fortified latexes for use as vehicles for printing inks and coatings.

The invention relates to a low foaming resin-fortified latex prepared by utilizing a polyelectrolyte resin and a nonionic emulsifier as cosurfactants in a free radical emulsion polymerization. The polyelectrolyte resin is preferably any low molecular weight resin which is soluble or dispersible in alkaline solutions. The nonionic cosurfactant is important to obtaining a low foaming emulsion and has an HLB value equal to or less than 13, preferably between 1 and 7, and a cloud point below the temperature applied in the preparation of the emulsion. The emulsion polymerization is carried out by conventional means i.e., monomers are added to a premix of polyelectrolyte resin, coemulsifier, water, initiator, and buffer. The addition of monomers and initiators may be regulated as necessary to achieve specific results; however, the monomers are generally added over a period of 2-6 hours. The resulting latex has excellent mechanical and freeze-thaw stability and very low foaming characteristics.

Fortified latexes are characterized as consisting of two distinct phases: an ammonia (or base) soluble, polymeric polyelectrolyte phase and an insoluble polymeric dispersed phase. The polymer of the soluble phase is preferably a relatively low molecular weight acrylic, styrene-acrylic or styrene-maleic anhydride copolymer or interpolymer containing a fairly high concentration of carboxylic functional groups. The dispersed polymer is preferably a non-functional high molecular weight acrylic, styrene, styrene-acrylic or styrene-butadiene homopolymer, copolymer or interpolymer.

Generally, the novel ink or coating composition of this invention contains pigment in the amount of 0.1–30 percent by weight. A variety of pigments can be used: metallic oxides, metallic hydroxides, metallic powders, chromates, sulfates, carbonates, carbon black, silica, talc, phtalocyanine blues and greens, indoline pigments and other organic pigments or dyes.

In the preparation of a novel coating/ink composition of this invention pigments are incorporated into mill bases and blended with the vehicles of the present invention. These bases contain water soluble and/or water dispersible resins or surfactants used as pigment dispersants. The pigments are dispersed by conventional techniques, such as sand grinding, ball milling, pebble milling or through the preparation of pigment chips and subsequent dispersion of these chips in a water miscible solvent or in water to form a mill base.

The coatings/inks based on the compositions of vehicles of this invention can be applied to a variety of substrates such as glass, plastics, metal, paper, paperboard and the like. The substrates of greatest interest and importance to this invention are plastic films, particularly these films that are difficult to print on because of poor adhesion such as high slip polyethylene, polypropylene or polyester. The novel coatings/inks of this invention can be applied to the above substrates by the usual methods such as electrostatic spraying, dipping, brushing, flexo and gravure printing, flow coating, electrocoating, and the like. The coatings/inks can be baked according to the conventional method or air dried. In printing, they are dried in conventional equipment without modification.

Latex polymers that are useful include the polymers and copolymers of ethylenically unsaturated monomers. Common unsaturated monomers include styrene, maleic anhydride, acrylic acid, methacrylic acid, methyl methacrylate, ethyl acrylate, butyl acrylate, 2-ethylhexyl acrylate, butadiene an the like.

Other olefins, usable in the preparation of fortified latexes of this invention, include p-methyl styrene, alpha-methyl styrene, vinyl toluene, vinyl acetate, vinyl chloride, vinyl methacrylate, vinyl propionate, vinyl pivalate, etc.

The non-ionic surfactants are used as costabilizers and codispersants in the manufacturing of fortified latexes in combination with anionic resin polyelectrolytes. Generally, they impart to the fortified latexes of this invention improved mechanical, thermal and freeze-thaw stability, as well as promote the formation of fine particles which is necessary for the formation of clear, glossy films on drying. According to our practice, the synthesis of the dispersed phase proceeds directly in the precharge, which is an aqueous solution of the polymeric resin polyelectrolyte dispersant and in which the non-ionic surfactant is dissolved or dispersed. This type of synthesis is characteristic of the fortified latexes of this invention and constitutes a preferred, synthetic approach in which an anionic polymeric polyelectrolyte resin and non-ionic surfactant complement and reinforce each other in producing a fine, stable microemulsion.

The other important reason for using non-ionic surfactant codispersants and costabilizers is the suppression of a tendency to form grit, coagulum and small unfilterable particle aggregates. Omitting the use of a non-ionic surfactant or reducing its level in a fortified latex formula can lead to excessive grit or particle aggregates formation, as indicated in a Comparative Example 6, or a larger particle latex that forms hazy and dull films, as shown in Comparative Examples 10, 11 and 12.

The non-ionic surfactants that are usable as costabilizers and codispersants in the fortified latexes can have various chemical structures and molecular weights. Examples of such surfactants are: GAF's Igepal CO series, BASF Pluronic, and Tetronic series, reverse Pluronic and Tetronic series and the Air Products Surfynol 400 series. Other surfactants are also usable, such as Air Product's Surfynol 104.

The effects of these non-ionic surfactants in stabilizing fortified latexes and imparting the properties outlined above depend on such characteristics as molecular weight, chemical structure, HLB, surface tension, solubility in water and/or solubility in the latex precharge solution in which the polymerization is carried out. It should be noted that a typical precharge solution of a fortified latex is basic with a pH of about 7.5–9.5. It contains a dissolved polyelectrolyte at relatively high concentration. The solubility of a non-ionic surfactant in such a medium, and the cloud point, may be altered in some cases. For example, in Example 9, the non-ionic surfactant is more soluble in the precharge of a typical fortified latex (i.e., its cloud point occurs at a higher temperature) than in water. This unexpected behavior permits the use of non-ionic surfactants which are insoluble in water, as satisfactory costabilizers in the preparation of fortified latexes of this invention to obtain good low foaming properties.

The non-ionic surfactants having HLB values from 1 to 13 can be used to obtain low to moderate foaming latexes. The preferred range of 1 to 7 is especially useful for use in making non-aqueous dispersions (NAD) which are water-in-oil emulsions. Normally, these surfactants are not considered as stabilizers for aqueous emulsion polymerization. Thus, the invention consists of using non-ionic surfactants which are not intended for use in oil-in-water emulsification typical of free radical emulsion polymerization in water, but rather water-in-oil emulsification.

The novelty of this application is that in fortified latexes, low HLB non-ionic surfactants perform the functions typically associated with the use of high HLB oil-in-water surfactants, such as ethoxylated alkyl phenols. They suppress the formation of grit and particle aggregates. The latexes stabilized by them form clear, transparent and glossy films.

The concentration of the non-ionic surfactants in fortified latexes of this invention, to be effective, should be between 1–10%, preferably 2–4 percent of the overall vehicle composition. Lower concentration may result in instability of the latex, formation of grit, or in low film gloss of the ink based on this latex. Higher concentration will result in the product losing its typical properties, such as block, rub and scuff resistances, because of the excessive plasticization by the non-ionic surfactant.

Additional and unexpected benefits can result from the use of low HLB, NAD type non-ionic surfactants in the fortified latexes of this invention. Inks containing these latexes do not require (or need less) a defoamer to control foaming. Less low-boiling alcohol is needed in ink formulation to lower the surface tension to improve printability and wetting. The latexes of this invention are, therefore, suitable for use in low VOC inks.

Sodium bicarbonate in a fortified latex is used as a buffer. It appears to be beneficial in manufacturing of clear, grit-free latexes. However, potassium or lithium bicarbonate may also be used.

A volatile base, or alkaline material is required in a fortified latex to maintain the polyelectrolyte resin in solution. Preferably, this base is ammonia, because it is volatile and relatively inexpensive. The ready evaporation of ammonia favors faster drying and guarantees quick development of water resistance that most of the inks must acquire after printing. Other volatile bases include any of the lower boiling amines such as methyl amine, dimethyl amine, trimethyl amine, ethyl amine, diethyl amine and triethyl amine. Monoethanol amine, diethanol amine and morpholine can also be used to achieve special effects such as better redispersibility on the press or slower drying. Sodium hydroxide, potassium hydroxide, sodium carbonate and other inorganic bases may be useful for special applications. The amount of a volatile base used must be sufficient to maintain solubility and uniformity of the ink, without settling out of the resin polyelectrolyte. We have found a pH of 8.0 to 8.5 to be a preferred range.

The (amine) ammonia/water soluble polymer should have an acid number between 50–500, preferably between 85-250 and neutralized with ammonia to 50-120 percent of stoichiometric neutralization, preferably 80-100% for rapid drying and development of water resistance.

The surface tension of the polymers of the fortified latexes of this invention, to be used as vehicles for printing on plastic films, should be, when dry, about 20-40 dynes/cm, as measured by Temple Patton's method as described in the Journal of Paint Technology, 42, (1970) on p. 666.

For application and for good adhesion to untreated or weakly treated as well as high slip polyethylene or polypropylene film surfaces, surface tension of the latex of this invention should preferably be between 26-35 dynes/cm. To be used as an anionic surfactant in the fortified latex polymerization, the molecular weight of the soluble polymer polyelectrolyte should be between 5,000-20,000 wt. average molecular weight. It is understood, however, that the surface tension of the water soluble polymer may be greater than that given above, if the dispersed polymer surface tension is within the range of 26-35 dynes/cm. For treated polyethylene or polypropylene surfaces the fortified latex polymer dried film could have the surface tension greater than 35 dynes/cm.

For the measurements of the foaming behavior of the fortified latexes the procedure shown in Example 18 was used. For the latex of this invention to be considered low foaming according to this test the initial foam height above the liquid line should be no higher than 50 mm and preferably within 0-40 mm range. The foam height after two hours should be no higher than 0-5 mm.

Specifically, Examples 13 to 18, refer to the fortified latexes tested for the initial foam height and foam disappearance with time according to the above procedure.

The following Examples, in which formulation ingredients are given in parts by weight further illustrate this invention.

EXAMPLE 1

EXAMPLE 1

COMPARATIVE EXAMPLE

| | Parts by Weight | Ingredients |
|---|---|---|
| A | 45.48 | Joncryl 584* |
| B | 3.64 | Igepal C0977** |
| C | 0.20 | Sodium bicarbonate |
| D | 17.39 | Deionized water |
| E | 0.20 | Ammonium persulfate |
| F | 0.60 | Deionized water |
| G | 18.61 | 2-Ethylhexyl acrylate |
| H | 13.88 | Methyl methacrylate |
| | 100.00 | |

*Joncryl 584 is a 30% solution of Joncryl 678, an acrylic resin with an acid number of 200, in ammoniated water. It is a product of S. C. Johnson and Son, Inc.
**Igepal C0977 is a 70% solution of a nonylphenoxypoly (ethyleneoxy) ethanol in water. It is a product of GAF Corporation.

PROCEDURE

A reactor was charged with A, B, C and D precharge. The agitation was started and the batch was sparged with nitrogen for 15 minutes. The precharge was heated to 82° C. and covered with nitrogen blanket which was left on for the duration of the process.

The temperature was stabilized at 82 C. The solution of E and F was charged. The addition of monomer solution of G and H was started and kept on at a steady rate for four hours. The temperature was maintained at 82° C.

After completion of monomer addition, the batch was processed at 82° C. for four hours. A sample was taken for solids and pH determination. Adjustments were made, if necessary. The batch was cooled to 50° C. and cast into a suitable storage container.

This batch, stabilized by a high HLB surfactant, Igepal C0977 was considered as a control for the purpose of this patent application. It was used for comparison of critical properties, such as foaming, stability, clarity and the adhesion to plastic films.

EXAMPLE 2

| | Parts by Weight | Ingredients |
|---|---|---|
| A | 46.31 | Joncryl 584* |
| B | 2.55 | Pluronic L61** |
| C | 0.20 | Sodium bicarbonate |
| D | 17.70 | Deionized water |
| E | 0.20 | Ammonium persulfate |
| F | 0.60 | Deionized water |
| G | 18.58 | 2-Ethylhexyl acrylate |
| H | 13.86 | Methyl methacrylate |
| | 100.00 | |

*Joncryl 584 is a 30% solution of Joncryl 678, an acrylic resin, acid number of 200, in ammoniated water. It is a product of S. C. Johnson and Son, Inc.
**Pluronic L61 is an ethylene oxide/propylene oxide block copolymer. It is a product of BASF Corporation.

PROCEDURE

The same procedure as in Example 1 was used.

This batch, stabilized by a low HLB surfactant, Pluronic L61, is a principal example of a low foaming latex of this patent application.

EXAMPLE 3

| | Parts by Weight | Ingredients |
|---|---|---|
| A | 39.47 | Polyelectrolyte* |
| B | 2.55 | Surfynol 465** |
| C | 0.20 | Sodium bicarbonate |
| D | 24.54 | Deionized water |
| E | 0.20 | Ammonium persulfate |
| F | 0.60 | Deionized water |
| G | 18.58 | 2-Ethylhexyl acrylate |
| H | 13.86 | Methyl methacrylate |
| | 100.00 | |

*This polyelectrolyte is a 34% solution of Joncryl 678, an acrylic resin in ammoniated water. Joncryl 678 is a product of S. C. Johnson and Son, Inc.
**Surfynol 465 is an ethylene oxide adduct of 2,4,7,9-tetramethyl-5-decyn-4,7, diol. It is a product of Air Products and Chemicals, Inc.

PROCEDURE

The same procedure as in Example 1 was used.

This batch, stabilized by an intermediate HLB surfactant, Surfynol 465, was an alternate example of a relatively low foaming latex of this patent application. (NOTE: Normal cloud point of Surfynol 465 is at 63° C. i.e., below the processing temperature of 82° C.).

EXAMPLE 4

| | Parts by Weight | Ingredients |
|---|---|---|
| A | 45.52 | Joncryl 584* |
| B | 2.55 | Pluronic L61** |
| C | 0.20 | Sodium bicarbonate |
| D | 18.65 | Deionized water |
| E | 0.20 | Ammonium persulfate |
| F | 0.60 | Deionized water |
| G | 24.65 | 2-Ethylhexyl acrylate |
| H | 7.63 | Methyl methacrylate |

EXAMPLE 4-continued

| Parts by Weight | Ingredients |
|---|---|
| 100.00 | |

*Joncryl 584 is a 30% solution of Joncryl 678, an acrylic resin, acid number of 200, in ammoniated water. It is a product of S. C. Johnson and Son, Inc.
**Pluronic L61 is an ethylene oxide/propylene oxide block copolymer. It is a product of BASF Corporation.

PROCEDURE

The same procedure as in Example 1 was used.

This batch, stabilized by a low HLB surfactant, Pluronic L61, is an important example of a low foaming latex of this patent application.

EXAMPLE 5

| | Parts by Weight | Ingredients |
|---|---|---|
| A | 45.52 | Joncryl 584* |
| B | 2.55 | Surfynol 104** |
| C | 0.20 | Sodium bicarbonate |
| D | 18.65 | Deionized water |
| E | 0.20 | Ammonium persulfate |
| F | 0.60 | Deionized water |
| G | 24.65 | 2-Ethylhexyl acrylate |
| H | 7.63 | Methyl methacrylate |
| | 100.00 | |

*Joncryl 584 is a 30% solution of Joncryl 678, an acrylic resin, acid number of 200, in ammoniated water. It is a product of S. C. Johnson and Son, Inc.
**Surfynol 104 is a 2,4,7,9-tetramethyl-5-decyn-4,7 diol. It is a product of Air Products and Chemicals, Inc.

PROCEDURE

The same procedure as in Example 1 was used.

This batch, stabilized by a low HLB surfactant Surfynol 104 is an important example of a low foaming stable latex.

EXAMPLE 6

COMPARATIVE EXAMPLE

| | Parts by Weight | Ingredients |
|---|---|---|
| A | 48.63 | Joncryl 584* |
| B | 1.46 | Igepal C0977** |
| C | 0.20 | Sodium bicarbonate |
| D | 14.60 | Deionized water |
| E | 0.20 | Ammonium persulfate |
| F | 0.60 | Deionized water |
| G | 19.66 | 2-Ethylhexyl acrylate |
| H | 14.65 | Methyl methacrylate |
| | 100.00 | |

*Joncryl 584 is a 30% solution of Joncryl 678, an acrylic resin, acid number of 200, in ammoniated water. It is a product of S. C. Johnson and Son, Inc.
**Igepal C0977 is a 70% solution of a nonylphenoxypoly(ethyleneoxy)ethanol in water. It is a product of GAF Corporation.

PROCEDURE

The same procedure as in Example 1 was used.

This batch, stabilized by a high HLB surfactant Igepal C0977, but a lower level than in Example 1. As a result it contained too much grit to be acceptable.

EXAMPLE 7

COMPARATIVE EXAMPLE

| | Parts by Weight | Ingredients |
|---|---|---|
| A | 0.20 | Sodium bicarbonate |
| B | 8.78 | Igepal C0977* |
| C | 45.83 | Deionized water |
| D | 0.20 | Ammonium persulfate |
| E | 0.60 | Deionized water |
| F | 25.43 | 2-Ethylhexyl acrylate |
| G | 18.96 | Methyl methacrylate |

EXAMPLE 7-continued

COMPARATIVE EXAMPLE

| Parts by Weight | Ingredients |
|---|---|
| 100.00 | |

*Igepal C0977 is a 70% solution of a nonylphenoxypoly(ethyleneoxy)ethanol in water. It is a product of GAF Corporation.

PROCEDURE

A reactor was charged with A, B and C precharge. The agitation was started and the batch was sparged with nitrogen for 15 minutes. The precharge was heated to 82° C. and covered with nitrogen blanket which was left on for the duration of the process.

The temperature was stabilized at 82° C. The solution of D and E was charged. The addition of monomer solution of F and G was started and kept on at a steady rate for four hours. The temperature was maintained at 82° C.

After completion of monomer addition, the batch was processed at 82° C. for three hours. The batch was then cooled and cast.

This latex, made without Joncryl 584 (compare with Example 1), had a relatively fine particle size. However, it was full of grit and tender to mechanical stress. Also, some coagulum settled on the bottom of flask. This example demonstrates that Igepal C0977, because of its solubility in water and high HLB, can be used as a latex dispersant; however, it yielded a latex having poor properties and mechanical stability.

EXAMPLE 8

COMPARATIVE EXAMPLE

| | Parts by Weight | Ingredients |
|---|---|---|
| A | 0.20 | Sodium bicarbonate |
| B | 6.12 | Pluronic L61* |
| C | 48.49 | Deionized water |
| D | 0.20 | Ammonium persulfate |
| E | 0.60 | Deionized water |
| F | 24.43 | 2-Ethylhexyl acrylate |
| G | 18.96 | Methyl methacrylate |
| | 100.00 | |

*Pluronic L61 is an ethylene oxide/propylene oxide block copolymers. It is a product of BASF Corporation.

PROCEDURE

The same procedure as in Example 7 was used.

This batch made without Joncryl 584 (compare with Example 1), was unacceptable as a latex. The product of emulsion polymerization collapsed completely already during synthesis. Pluronic L61 by itself was shown to be inadequate to act as a latex surfactant and stabilizer because of its low HLB and insolubility in water.

EXAMPLE 9

COMPARATIVE EXAMPLE

| Ingredients | Column 1 Precharge Parts by Weight | Column 2 Water/Pluronic L61 Parts by Weight |
|---|---|---|
| A. Joncryl 584* | 69.4 | — |
| B. Pluronic L61** | 3.8 | 3.8 |
| C. Sodium bicarbonate | 0.3 | — |
| D. Deionized water | 26.5 | 96.2 |
| | 100.0 | 100.0 |

*Joncryl 584 is a 30% solution of Joncryl 678, an acrylic resin, acid number of 200, in ammoniated water. It is a product of S. C. Johnson and Son, Inc.
**Pluronic L61 is an ethylene oxide/propylene oxide block copolymer. It is a product of BASF Corporation.

The precharge (Column 1) was typical of the latex given in Example 2. On mixing it was clear, one phase, and transparent. It foamed somewhat on shaking, but the foam collapsed quickly. The water/Pluronic L61 mixture (column 2) was two-phase and hazy on shaking. It did not foam on shaking.

EXAMPLE 10

COMPARATIVE EXAMPLE

| | Parts by Weight | Ingredients |
|---|---|---|
| A | 37.62 | Polyelectrolyte* |
| B | 3.64 | Igepal C0977** |
| C | 0.20 | Sodium bicarbonate |
| D | 26.02 | Deionized water |
| E | 0.20 | Ammonium persulfate |
| F | 0.60 | Deionized water |
| G | 12.34 | 2-Ethylhexyl acrylate |
| H | 19.38 | Styrene |
| | 100.00 | |

*This polyelectrolyte is a 35% solution of an acrylic resin composed of styrene, ethyl acrylate and acrylic acid described in copending CIP, etc.
**Igepal C0977 is a 70% solution of nonylphenoxy poly(ethylenoxy)ethanol in water. It is a product of GAF Corporation.

PROCEDURE

The same procedure as in Example 1 was used.

This batch stabilized by Igepal C0977 was considered as a control to Example 11, which was stabilized by a reduced level of Igepal C0977, and Example 12 in which no non-ionic costabilizer was used.

The batch of this Example was clean with little coagulum or grit. Its film was clear, transparent and water white.

EXAMPLE 11

COMPARATIVE EXAMPLE

| | Parts by Weight | Ingredients |
|---|---|---|
| A | 37.19 | Polyelectrolyte* |
| B | 1.46 | Igepal C0977** |
| C | 0.20 | Sodium bicarbonate |
| D | 27.10 | Deionized water |
| E | 0.20 | Ammonium persulfate |
| F | 0.60 | Deionized water |
| G | 12.93 | 2-Ethylhexyl acrylate |
| H | 20.32 | Styrene |
| | 100.00 | |

*This polyelectrolyte is a 35.0% solution of an acrylic resin composed of styrene, ethyl acrylate and acrylic acid described in copending CIP, etc.
**Igepal C0977 is a 70% solution of nonylphenoxypoly(ethylenoxy)ethanol in water. It is a product of GAF Corporation.

PROCEDURE

The same procedure as in Example 1 was used.

This batch containing lower level of nonionic costablizer Igepal C0977 should be compared to the batch of Example 10. Its film was hazy and dull. The batch showed signs of instability during processing.

EXAMPLE 12

COMPARATIVE EXAMPLE

| | Parts by Weight | Ingredients |
|---|---|---|
| A | 37.19 | Polyelectrolyte* |
| B | 0.20 | Sodium bicarbonate |
| C | 27.54 | Deionized water |
| D | 0.20 | Ammonium persulfate |
| E | 0.60 | Deionized water |
| F | 13.33 | 2-Ethylhexyl acrylate |
| G | 20.94 | Styrene |
| | 100.00 | |

*This polyelectrolyte is a 35% solution of an acrylic resin composed of styrene, ethylacrylate and acrylic acid in ammoniated water and described in copending CIP.

PROCEDURE

A reactor was charged with A, B and C precharge. The agitation was turned on and the batch was sparged with nitrogen for 15 minutes. The precharge was heated to 82° C. and covered with nitrogen blanket which was left on for the duration of the process.

The temperature was stabilized at 82° C. The solution of D and E was charged. This was followed by the addition of the monomer solution of F and G at a steady rate for four hours.

After completion of monomer addition, the batch was processed at 82° C. for three and a half hours. The batch was then cooled, to 50° C., cast and characterized.

This batch, containing no non-ionic costabilizer Igepal C0977, should be compared to batches of Example 10 and 11. Its film was extremely hazy and dull. The batch showed signs of instability during processing.

EXAMPLE 13

COMPARATIVE EXAMPLE

| | Parts by Weight | Ingredients |
|---|---|---|
| A | 50.38 | Acrylic resin solution* |
| B | 3.56 | Igepal C0977** |
| C | 0.20 | Sodium bicarbonate |
| D | 15.54 | Deionized water |
| E | 0.25 | Ammonium persulfate |
| F | 0.34 | Deionized water |
| G | 29.73 | Styrene |
| | 100.00 | |

*This polyelectrolyte is a 35% solution of an acrylic resin in ammoniated water described in copending CIP etc.
**Igepal C0977 is a 70% solution of nonylphenoxypoly(etheleneoxy)ethanol in water. It is a product of GAF Corporation.

PROCEDURE

The same procedure as in Example 1 was used.

This product latex, having a solids content of 50.7% and a pH of 7.7, was used as a comparison standard for the evaluation of the foaming properties as described in Example 18 and 18A.

EXAMPLE 14

Except for item B, the same ingredients, amounts, and procedure described in Comparative Example 13 were used.

In place of Item B (Igepal C0977) an equivalent amount, based on solids content, of Pluronic L-61 was substituted. The product latex, having a solids content of 49.5% and a pH of 7.8, was examined for foaming properties as described in Example 18B.

EXAMPLE 15

Except for Item B, the same ingredients, amounts, and procedure described in Comparative Example 13 were used.

In place of Item B (Igepal C0977) an equivalent amount, based on solids content, of Pluronic 17R1 were substituted.

The product latex, having a solids content of 51.5% and a pH of 7.6, was examined for foaming properties as described in Example 18C.

EXAMPLE 16

Except for Item B, the same ingredients, amounts, and procedure described in Comparative Example 13 were used.

In place of Item B (Igepal C0977) an equivalent amount, based on solids content, of Tetronic 701 was substituted.

The product latex, having a solids content of 50.3% and a pH of 7.5, was examined for foaming properties as described in Example 18D.

EXAMPLE 17

COMPARATIVE EXAMPLE

Except for Item B, the same ingredients, amounts, and procedure described in Comparative Example 13 were used.

In place of Item B (Igepal C0977) an equivalent amount, based on solids content, of Pluronic L-43 was substituted.

The product latex, having a solids content of 50.4% and a pH of 7.5, was examined for foaming properties as described in Example 18E. This example demonstrates the enhanced foaming tendency upon using a co-surfactant having a HLB range of 7-12.

EXAMPLE 18

FOAMING BEHAVIOR

Foaming behavior was measured by placing 25.0 g of the designated latex into a 5½ inch tall Mason jar having a diameter of 2 inches and capacity of 8 liquid ounces, adding an equal weight of deionized water, mixing, and placing the sample, along with an equally diluted comparison standard, into a Red Devil (T.M.) paint conditioner for a 15 minute period. Immediately, thereafter, the total foam/liquid height and the height of the bottom liquid layer were measured. The measurements were repeated at periodic intervals extending over a time period of two hours. An abbreviated tabulation of the difference in the two measurements vs. time is shown below.

| Example | Latex | Foam Height (in millimeters) After Time | | | | | |
|---|---|---|---|---|---|---|---|
| | | 1 min. | 15 min. | 30 min. | 45 min. | 1 hr. | 2 hr. |
| A | (Comparative) Example-13 | 108 | 94 | 76 | 43 | 24 | 11 |
| B | Example-14 | 17 | 8 | 6 | 5 | 3 | 0 |
| C | Example-15 | 18 | 8 | 6 | 4 | 2 | 0 |
| D | Example-16 | 38 | 20 | 17 | 14 | 12 | 5 |
| E | (Comparative) Example-17 | 46 | 32 | 26 | 22 | 18 | 15 |

We claim:

1. A low foaming resin-fortified latex comprising a dispersed acrylic polymer, a polyelectrolyte resin with an acid number between 50 and 500, and having a weight average molecular weight of 5000–20000; a non-ionic emulsifier with an HLB of 13 or less.

2. The resin-fortified latex of claim 1 wherein the polyelectrolyte resin is selected from the group consisting of styrene-acrylic polyelectrolytes, styrene-maleic anhydride polyelectrolytes and acrylic polyelectrolytes.

3. The resin-fortified latex polymer of claim 1 wherein the non-ionic emulsifier is an ethylene oxide-propylene oxide block copolymer.

4. The resin-fortified latex of claim 1 wherein the non-ionic emulsifier is an ethylene oxide adduct of 2,4,7,-tetramethyl-5-decyn-4,7-diol.

* * * * *